(12) United States Patent
Terasawa (10) Patent No.: US 7,546,340 B2
(45) Date of Patent: Jun. 9, 2009

(54) PORTABLE SERVER AND PORTABLE SERVER SYSTEM

(75) Inventor: Toshiharu Terasawa, Tokyo (JP)

(73) Assignee: Sony Corporation (JP)

( * ) Notice: Subject to any disclaimer, the term of this patent is extended or adjusted under 35 U.S.C. 154(b) by 902 days.

(21) Appl. No.: 10/732,262

(22) Filed: Dec. 11, 2003

(65) Prior Publication Data

US 2004/0205123 A1 Oct. 14, 2004

(30) Foreign Application Priority Data

Dec. 25, 2002 (JP) ............................ P2002-373688

(51) Int. Cl.
*G06F 15/16* (2006.01)
(52) U.S. Cl. ..................................... 709/203
(58) Field of Classification Search ................. 709/203, 709/219, 250, 3; 455/3.01; 725/5, 6
See application file for complete search history.

(56) References Cited

U.S. PATENT DOCUMENTS

| | | | | |
|---|---|---|---|---|
| 7,030,517 | B2* | 4/2006 | Hansmann et al. | 307/150 |
| 7,092,369 | B2* | 8/2006 | Fuccello et al. | 370/328 |
| 2001/0043273 | A1* | 11/2001 | Herrod et al. | 348/220 |
| 2002/0046353 | A1* | 4/2002 | Kishimoto | 713/202 |
| 2002/0075843 | A1* | 6/2002 | Lau | 370/349 |
| 2002/0107042 | A1* | 8/2002 | Murnaghan et al. | 455/550 |
| 2003/0055738 | A1* | 3/2003 | Alie | 705/26 |
| 2003/0065626 | A1* | 4/2003 | Allen | 705/76 |
| 2003/0115240 | A1* | 6/2003 | Cho | 709/102 |
| 2003/0214779 | A1* | 11/2003 | Socolofsky | 361/683 |
| 2004/0148515 | A1 | 7/2004 | Kikuchi | |
| 2004/0192299 | A1* | 9/2004 | Wilson et al. | 455/433 |

FOREIGN PATENT DOCUMENTS

JP 05-143254 6/1993

* cited by examiner

*Primary Examiner*—Krisna Lim
(74) *Attorney, Agent, or Firm*—Rader Fishman & Grauer PLLC; Ronald P. Kananen (57) ABSTRACT

A portable server has a battery accommodated in a housing and supplying power to a wireless communication unit, to a memory unit, and to an internal circuit. The wireless communication unit sends and receives data to and from terminal devices via wireless communication. The memory unit stores data received by the wireless communication unit, and data to be sent to the terminal devices. As described above, the portable server has the battery for supplying power to the wireless communication unit, to the memory unit, and to the internal circuit. This allows the portable server to send and receive data to and from the terminal devices via wireless communication. Thus, power supplied from an AC outlet becomes unnecessary, and a network can be created anywhere without locational constraints.

16 Claims, 7 Drawing Sheets

PORTABLE SERVER AND PORTABLE SERVER SYSTEM

BACKGROUND OF THE INVENTION

1. Field of the Invention

The present invention relates to portable servers and portable server systems and, in particular, to a portable server and a portable server system for sending and receiving data to and from a plurality of terminal devices via wireless communication.

2. Description of the Related Art

Data communication between electronic devices is often performed via wireless communication systems such as a wireless local area network (LAN). An example is a wireless print server that is shared among a plurality of information processing devices via wireless communication (see Japanese Unexamined Patent Application Publication No. 5-143254 (in particular, page 2 and FIG. 2)). Use of wireless communication provides ease of installation and wiring, and a reduced space for wiring.

However, there are some wireless servers, such as some types of network attached storage (NAS), which are not portable due to their sizes.

Attempts have been made to reduce their sizes so that a network can be created anywhere. A location for creating a network is limited, however, when an alternating current (AC) outlet is required for a power supply.

SUMMARY OF THE INVENTION

The present invention is made in view of the problem described above. An object of the present invention is to provide a portable server and a portable server system that incorporate a battery for a power supply to create a network without locational constraints.

To solve the problem described above, a portable server for sending and receiving data to and from a plurality of terminal devices includes a wireless communication unit for sending and receiving the data via wireless communication, a memory unit for storing the data, and a battery in a housing for supplying power to an internal circuit, the wireless communication unit, and the memory unit.

Since the battery of this portable server supplies power for communicating data with terminal devices via wireless communication, a network can be created anywhere without locational constraints.

DESCRIPTION OF THE PREFERRED EMBODIMENTS

The embodiments of the present invention will now be described with reference to the drawings.

Figure 1:
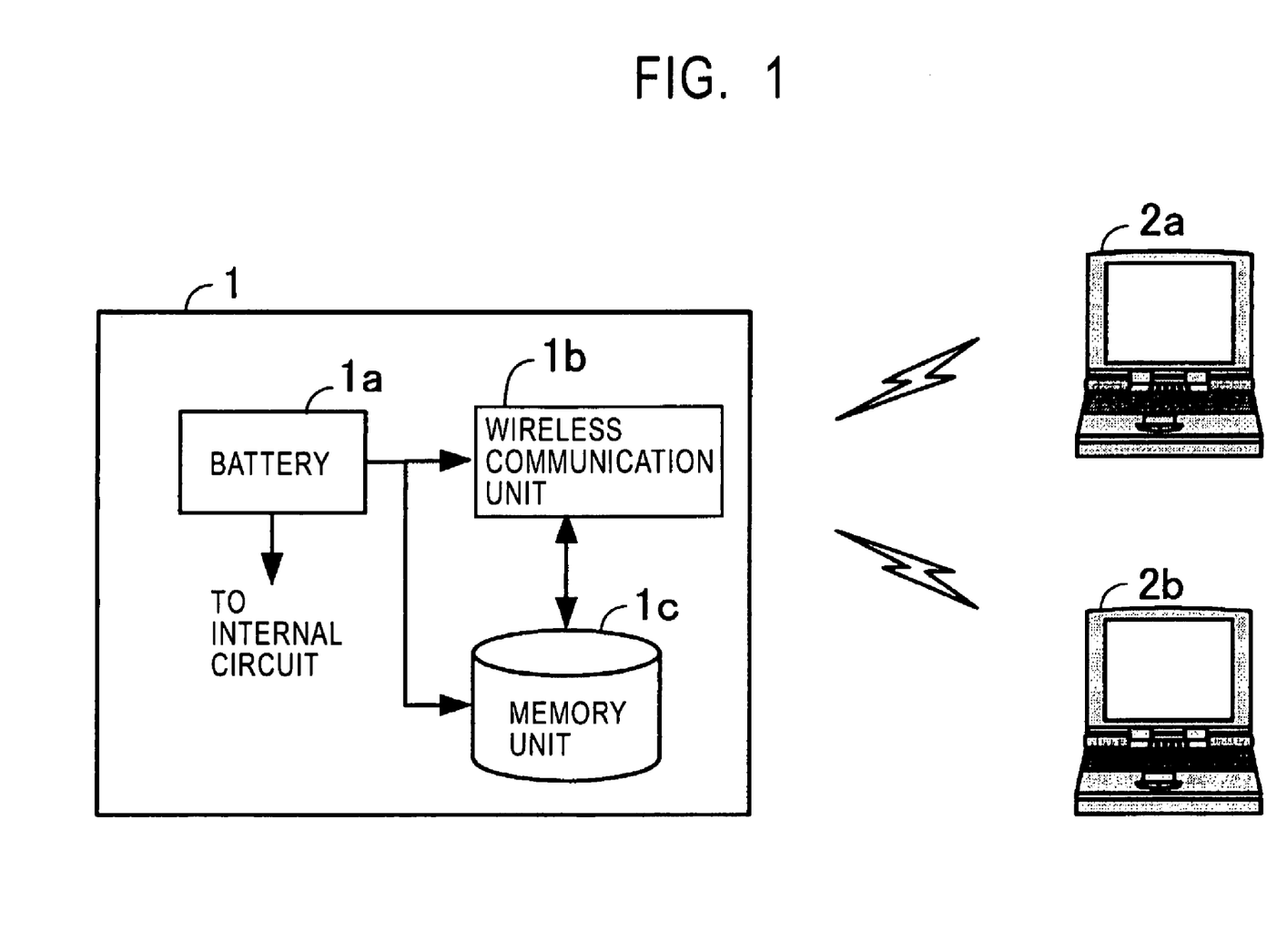
FIG. 1 is a schematic diagram of a portable server according to the present invention.

Referring to FIG. 1, a portable server 1 of the present invention includes a battery 1a, a wireless communication unit 1b, and a memory unit 1c. A terminal device 2a and a terminal device 2b that perform wireless communication with the portable server 1 are also illustrated in FIG. 1.

The battery 1a is accommodated in a housing of the portable server 1. To drive the portable server 1, the battery 1a supplies power to an internal circuit, the wireless communication unit 1b, and the memory unit 1c that are included in the portable server 1.

The wireless communication unit 1b is powered by the battery 1a and sends and receives data to and from the terminal devices 2a and 2b via wireless communication.

The memory unit 1c is powered by the battery 1a and stores data received by the wireless communication unit 1b. The memory unit 1c also stores data to be sent from the wireless communication unit 1b to the terminal device 2a and the terminal device 2b.

Since the battery 1a is provided for supplying power to the internal circuit and for sending and receiving data to and from the terminal devices 2a and 2b via wireless communication, an external power supply, for example, from an AC outlet, is unnecessary and a network with terminal devices can be created anywhere without locational constraints.

Figure 2:
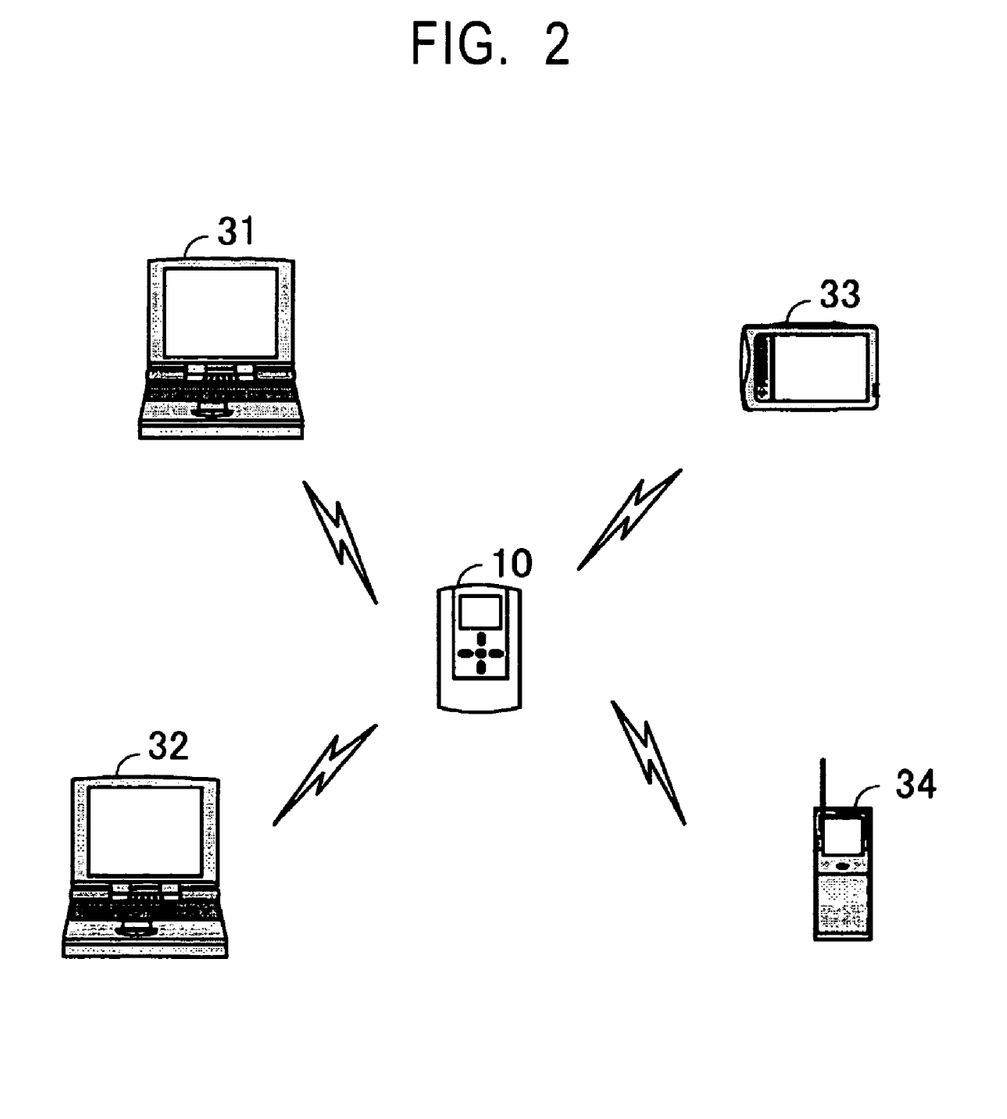
FIG. 2 shows an example of the use of the portable server.

FIG. 2 shows an example of the use of the portable server. A portable server 10 forms a network with terminal devices 31 to 34 via wireless communication. The terminal devices 31 and 32 are both notebook personal computers, the terminal device 33 is a personal digital assistant (PDA), and the terminal device 34 is a cellular phone.

The portable server 10 is powered by a battery in a housing. The portable server 10, therefore, does not require an AC outlet and can perform wireless communication with the terminal devices 31 to 34 anywhere without locational constraints.

The portable server 10 stores data received from the terminal devices 31 to 34, and sends the stored data back to the terminal devices 31 to 34. This allows the terminal devices 31 to 34 to share data in the portable server 10.

Moreover, the portable server 10 defines a transmission distance of radio waves. When located within the predetermined transmission distance, the terminal devices 31 to 34 can send and receive data to and from the portable server 10. Unauthorized access to the portable server 10 from third parties located out of the predetermined transmission distance can thus be blocked.

Figure 3:
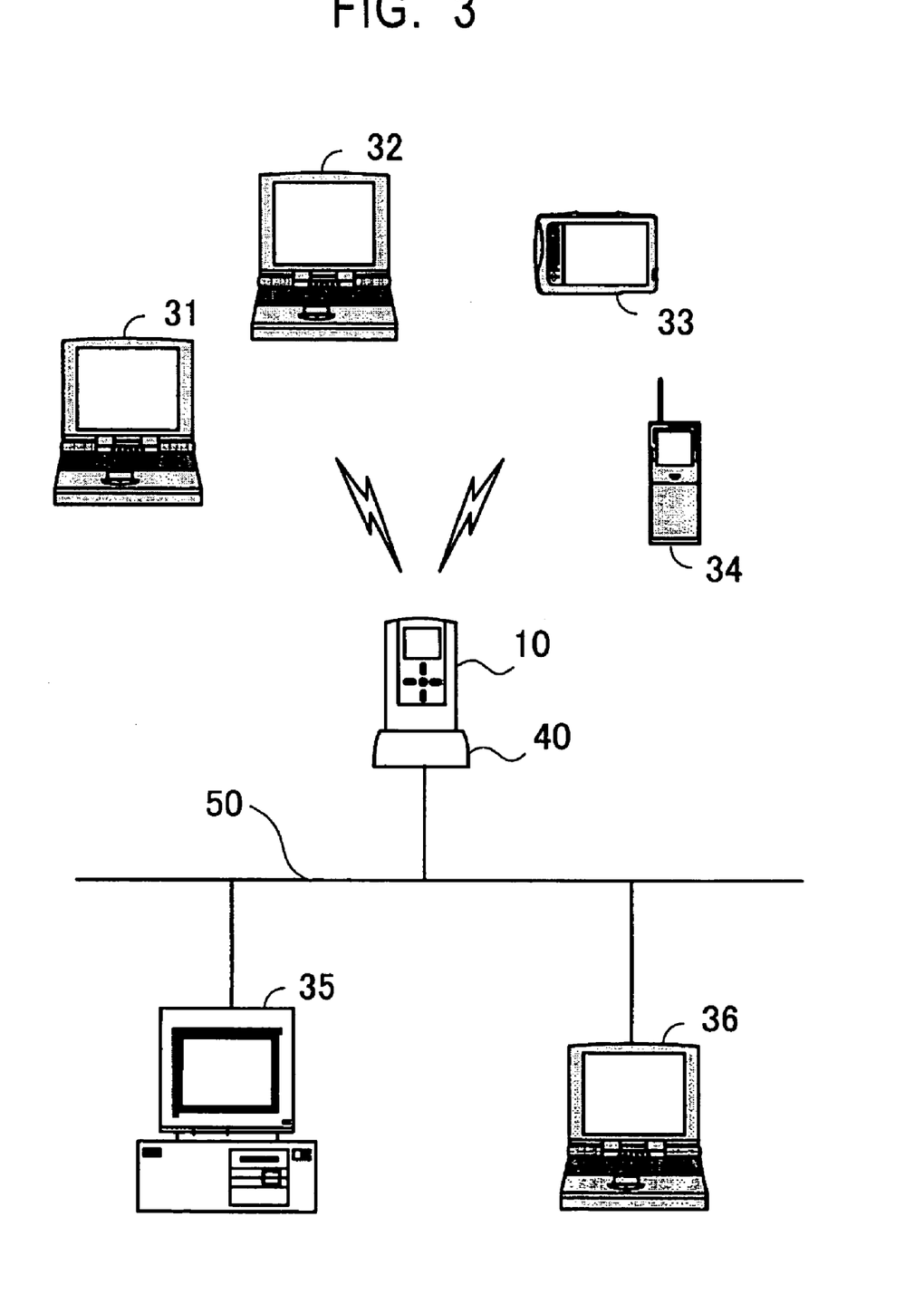
FIG. 3 shows an example of the use of the portable server that is connected to a wired network.

The portable server 10 also can be connected to a wired network and can communicate with terminal devices connected to the same wired network. FIG. 3 shows an example of the use of the portable server that is connected to a wired network. As illustrated, a cradle 40 holding the portable server 10 is connected to a LAN 50, that is, a wired network. A terminal device 35, which is a desktop personal computer, and a terminal device 36, which is a notebook personal computer, are also connected to the LAN 50. The terminal devices 35 and 36 cannot perform wireless communication, but can send and receive data only via the LAN 50. The cradle 40 allows the portable server 10 to connect to the LAN 50 for sending and receiving data to and from the terminal devices 35 and 36.

FIG. 3 also shows the terminal devices 31 to 34 that send and receive data to and from the portable server 10 via wireless communication, as illustrated in FIG. 2. As described above, the portable server 10 defines the transmission distance of the radio waves so that the terminal devices 31 to 34 can send and receive data to and from the portable server 10, only when located within a predetermined transmission distance.

By being attached to the cradle 40, the portable server 10 can send and receive data, via the wired LAN 50, to and from the terminal devices 35 and 36 that cannot perform wireless communication. Further, the portable server 10 can send and receive data to and from the terminal devices 31 to 34 via wireless communication. Therefore, the terminal devices 31 to 34 that can perform wireless communication and the terminal devices 35 and 36 that cannot perform wireless communication, can send, receive, and share data with each other via the portable server 10.

Figure 4A:
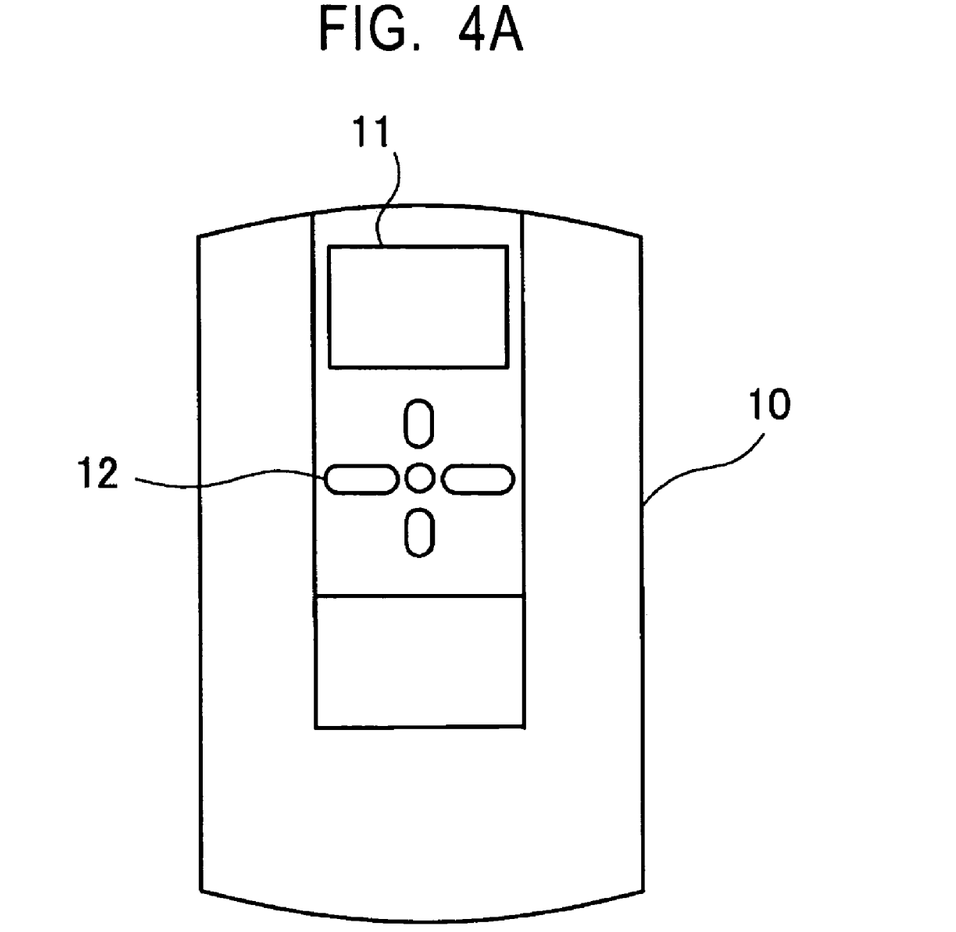
FIG. 4A is a front view showing an outer appearance of the portable server.
Figure 4B:
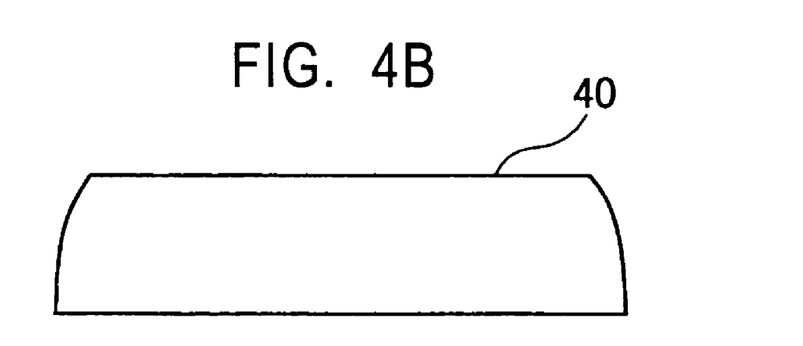
FIG. 4B is a front view showing an outer appearance of a cradle.

FIG. 4A is a front view showing an outer appearance of the portable server, and FIG. 4B is a front view showing an outer appearance of a cradle. As shown in FIG. 4A, the portable server 10 has a liquid crystal display (LCD) 11 and a keypad 12. The cradle 40 shown in FIG. 4B is connected to the LAN 50 shown in FIG. 3.

By being attached to the cradle 40, the portable server 10 can be connected to the LAN 50, and can send and receive data to and from the terminal devices 35 and 36.

Figure 5:
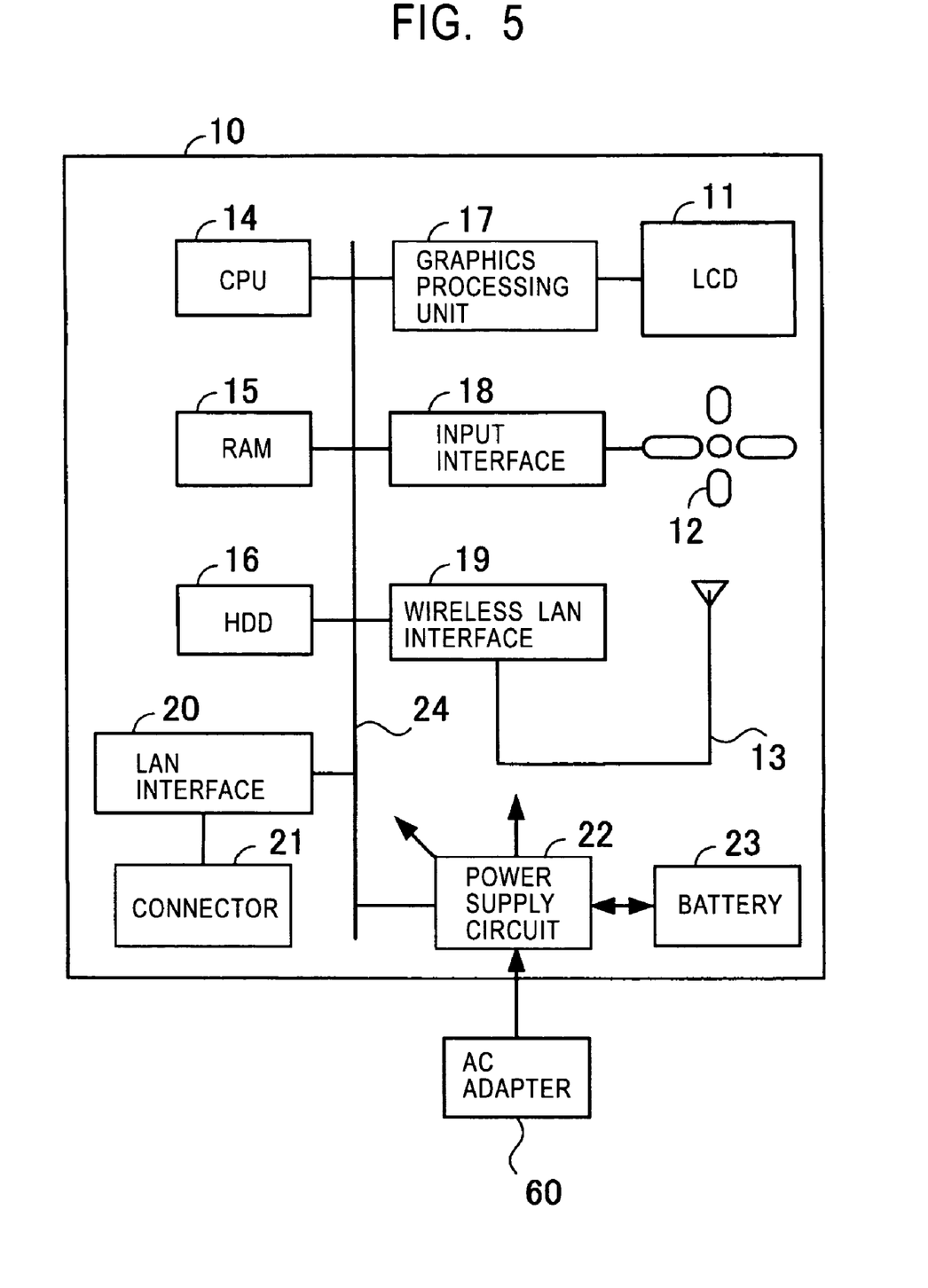
FIG. 5 is a block diagram of the portable server.

FIG. 5 is a block diagram of the portable server. As illustrated, the portable server 10 includes the LCD 11, the keypad 12, an antenna 13, a central processing unit (CPU) 14, a random access memory (RAM) 15, a hard disk drive (HDD) 16, a graphics processing unit 17, an input interface 18, a wireless LAN interface 19, a LAN interface 20, a connector 21, a power supply circuit 22, a battery 23, and a bus 24. FIG. 5 also shows an AC adapter 60 that converts AC power supplied from an AC outlet into DC power and supplies the DC power to the portable server 10.

The RAM 15 temporarily stores at least part of the operating system (OS) programs and application programs to be executed by the CPU 14. The RAM 15 also stores a variety of data required for processing operations of the CPU 14. The HDD 16 stores, for example, OS programs and application programs. The HDD 16 also stores data shared by the terminal devices 31 to 36 shown in FIGS. 2 and 3.

The graphics processing unit 17 is connected to the LCD 11. In response to instructions from the CPU 14, the graphics processing unit 17 allows the LCD 11 to display images.

The input interface 18 is connected to the keypad 12. The input interface 18 forwards signals from the keypad 12 via the bus 24 to the CPU 14.

The wireless LAN interface 19 is connected to the built-in antenna 13. In response to instructions from the CPU 14, the wireless LAN interface 19 sends and receives data to and from the terminal devices 31 to 34 via a wireless LAN. In response to instructions from the CPU 14, moreover, the wireless LAN interface 19 controls the output current to the antenna 13 and changes the transmission distance of the radio waves. Incidentally, the terminal devices 31 to 34 shown in FIG. 2 can send and receive data via a wireless LAN.

The LAN interface 20 is connected to the connector 21 that fits in the connector of the cradle 40 shown in FIG. 4. The connector of the cradle 40 is further connected to the LAN 50. That is, when the portable server 10 is inserted into the cradle 40, the connector 21 is connected to the LAN 50. In response to instructions from the CPU 14, the LAN interface 20 sends and receives data via the LAN 50 to and from the terminal devices 35 and 36.

The power supply circuit 22 is connected to the AC adapter 60. The AC adapter 60 receives a voltage from the AC outlet, reduces the voltage to be adjusted to the portable server 10, and supplies the reduced voltage to the power supply circuit 22. The power supply circuit 22 then supplies the voltage from the AC adapter 60 to an internal circuit that enables the portable server 10 to operate. The internal circuit includes the components shown in FIG. 5 and other circuits and units of the portable server 10 that are not shown in FIG. 5. The power supply circuit 22 also supplies the voltage from the AC adapter 60 to the battery 23 for maintaining the battery 23 in a fully charged condition. When the AC adapter 60 is disconnected, the power supply circuit 22 supplies the voltage of the battery 23 to the internal circuit of the portable server 10. When the voltage from the AC adapter 60 is shut off due to, for example, a power failure or a disconnection of the plug of the AC adapter 60 from the AC outlet, the power supply circuit 22 switches the voltage of the battery 23 to be supplied to the internal circuit of the portable server 10. The battery 23 is in a housing of the portable server 10 and supplies power to the internal circuit.

Figure 6:
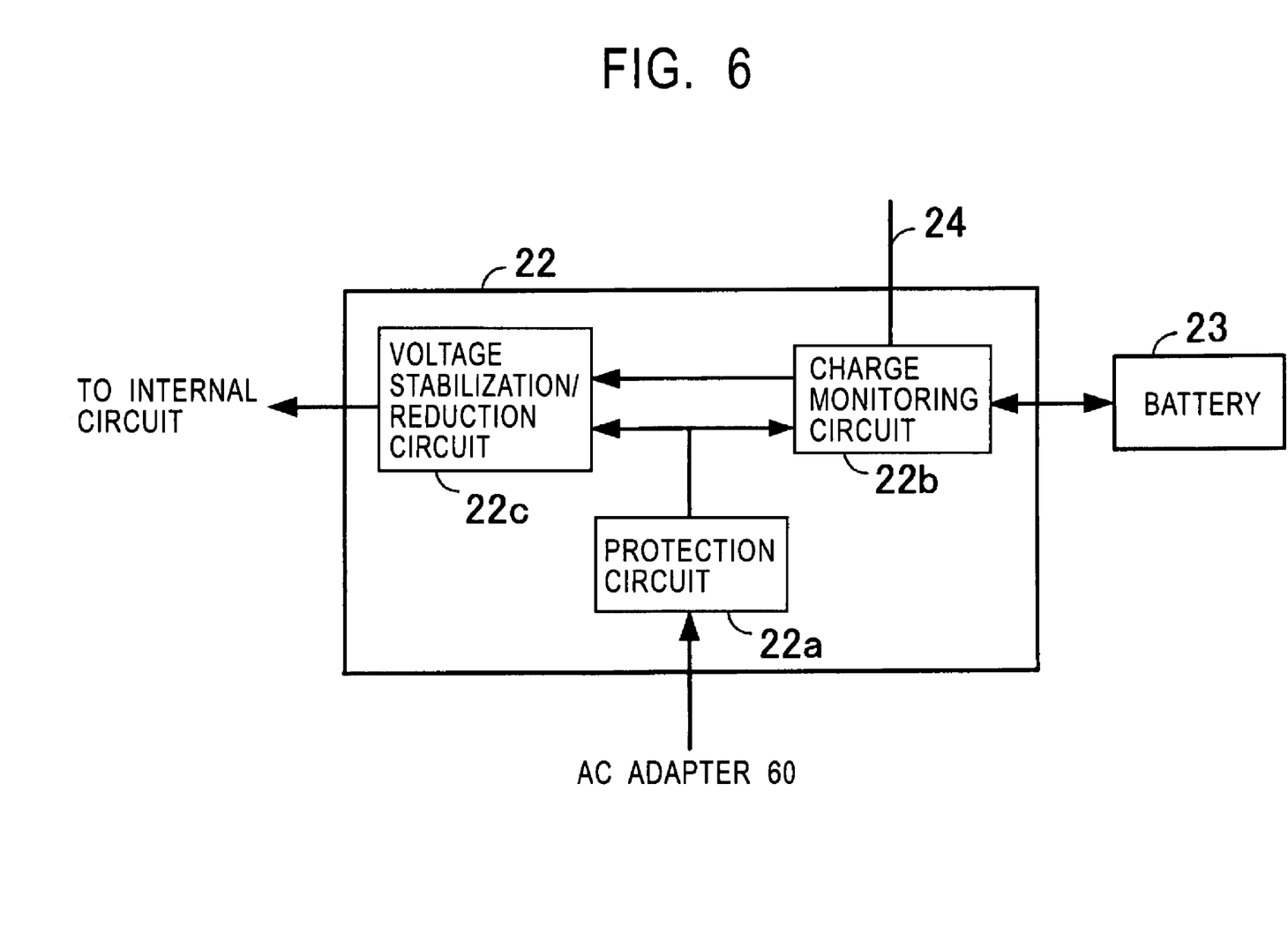
FIG. 6 shows a power supply circuit in detail.

FIG. 6 illustrates a power supply circuit in detail. The power supply circuit 22 includes a protection circuit 22a, a charge monitoring circuit 22b, and a voltage stabilization/reduction circuit 22c.

The protection circuit 22a outputs voltage, which is supplied from the AC adapter 60, to the charge monitoring circuit 22b and to the voltage stabilization/reduction circuit 22c. For protecting the internal circuit of the portable server 10, the protection circuit 22a shuts off high voltage input caused by, for example, misuse of the AC adapter 60.

When voltage is output from the protection circuit 22a, the charge monitoring circuit 22b supplies the voltage to the battery 23 for charging it. When no voltage is output from the protection circuit 22a due to, for example, disconnection of the AC adapter 60, the charge monitoring circuit 22b outputs the voltage of the battery 23 to the voltage stabilization/reduction circuit 22c.

The charge monitoring circuit 22b is connected to the bus 24. The charge monitoring circuit 22b detects the voltage of the battery 23, according to instructions from the CPU 14, and sends the result back to the CPU 14. When the voltage of the battery 23 drops to a predetermined voltage (which is just above the voltage that causes the internal circuit to malfunction), the CPU 14 stores the current state of the internal circuit in the HDD 16 and shuts off the voltage from the charge monitoring circuit 22b to the voltage stabilization/reduction circuit 22c.

The voltage stabilization/reduction circuit 22c outputs voltage supplied from the protection circuit 22a or from the charge monitoring circuit 22b to the internal circuit. The internal circuit normally requires two types of power sources, because some integrated circuits (ICs) operate at 5 V, while others operate at 3.3 V. Accordingly, two levels of voltage, that is, a voltage from the protection circuit 22a or from the terminal device 2b and its reduced voltage, are output.

The CPU 14 is connected, via the bus 24, to the RAM 15, the HDD 16, the graphics processing unit 17, the input interface 18, the wireless LAN interface 19, the LAN interface 20, and the power supply circuit 22. Thus, the CPU 14 controls the entire system.

In response to a request entered from the keypad 12, the CPU 14 controls the output current to the antenna 13 of the wireless LAN interface 19, for changing the transmission distance of the radio waves. For example, when a request for increasing the transmission distance of the radio waves is entered from the keypad 12, the CPU 14 instructs the wireless LAN interface 19 to increase the transmission distance of the radio waves. Accordingly, the wireless LAN interface 19 increases the output current to the antenna 13 for increasing the transmission distance of the radio waves.

Requests for changing the transmission distance of the radio waves also can be entered from the terminal devices 31 to 34. The antenna 13 receives the data from the terminal devices 31 to 34 for defining the transmission distance of the radio waves. The data received is sent to the CPU 14 via the wireless LAN interface 19 and the bus 24. The CPU 14 then changes the transmission distance of the radio waves according to the data received. Further, requests for changing the transmission distance of the radio waves also can be entered from the terminal devices 35 and 36 that are connected to the LAN 50. The connector 21 receives the data for defining the transmission distance of the radio waves from the terminal devices 35 and 36. The data received is sent to the CPU 14 via the LAN interface 20 and the bus 24. The CPU 14 then changes the transmission distance of the radio waves according to the data received.

The CPU 14 compares a password entered at power-on, with a password preset in the HDD 16. The keypad 12 or the terminal devices 31 to 36 can be used to enter or preset the password. The CPU 14 allows data to be sent and received when the password entered matches with the password preset. When the two passwords do not match, the CPU 14 does not allow data to be sent and received, and a prompt for a password is maintained.

For example, the portable server 10 described above is brought into a room where no AC outlet is provided. The portable server 10 then creates a network with the terminal devices 31 to 34. When power is turned on, the battery 23 supplies power to the internal circuit of the portable server 10. The portable server 10 accepts a password entered by the keypad 12 or the terminal devices 31 to 34. When the password entered does not match with the password preset in the HDD 16, the CPU 14 does not allow the portable server 10 to send and receive data to and from the terminal devices 31 to 34, and a prompt for a password is maintained. When the two passwords match, the CPU 14 allows the portable server 10 to send and receive data to and from the terminal devices 31 to 34.

The portable server 10 accepts a request from the keypad 12 or the terminal devices 31 to 36 for presetting the transmission distance of the radio waves. The transmission distance of the radio waves is limited within the room, in this example.

Powered by the battery 23, the portable server 10 sends and receives data to and from the terminal devices 31 to 34 in the room. When this causes the voltage of the battery 23 to drop to a predetermined value, the CPU 14 stores the current state of the internal circuit in the HDD 16 and shuts off the power supply of the battery 23 to the internal circuit.

The AC adapter 60 can be used, when an AC outlet is provided in the room where the portable server 10 and the terminal devices 31 to 34 are brought in. If power from the AC adapter 60 is shut off due to, for example, a power failure, the power supply circuit 22 allows the battery 23 to supply power to the internal circuit. When the wired LAN 50 is provided, moreover, the cradle 40 can be connected to the LAN 50, and the portable server 10 can be inserted into the cradle 40. This allows the portable server 10 to send and receive data to and from the terminal devices 35 and 36 that cannot perform wireless communication.

Since the battery 23 supplies power to the internal circuit for allowing the portable server 10 to send and receive data to and from the terminal devices 31 to 36 via wireless communication, a network can be created anywhere without locational constraints.

Even if the portable server 10 is stolen and used by third parties, for example, password authentication prevents stored data from being accessed by unauthorized users.

Before a voltage of the battery 23 drops to a voltage that causes the internal circuit to malfunction, the current state of the internal circuit is stored in the HDD 16 and power from the battery 23 is shut off. This prevents data from being lost.

If the power supply from the AC adapter 60 is interrupted for any reason, the battery 23 supplies power to prevent a loss of data.

Further, a connection with the wired LAN 50 allows the portable server 10 to share data with the terminal devices 35 and 36 that cannot perform wireless communication.

The portable server 10 described above can be used, for example, at a meeting in a reception room where no network cable is provided. The users of the terminal devices 31 to 34 can even play games during a meeting break.

Figure 7:
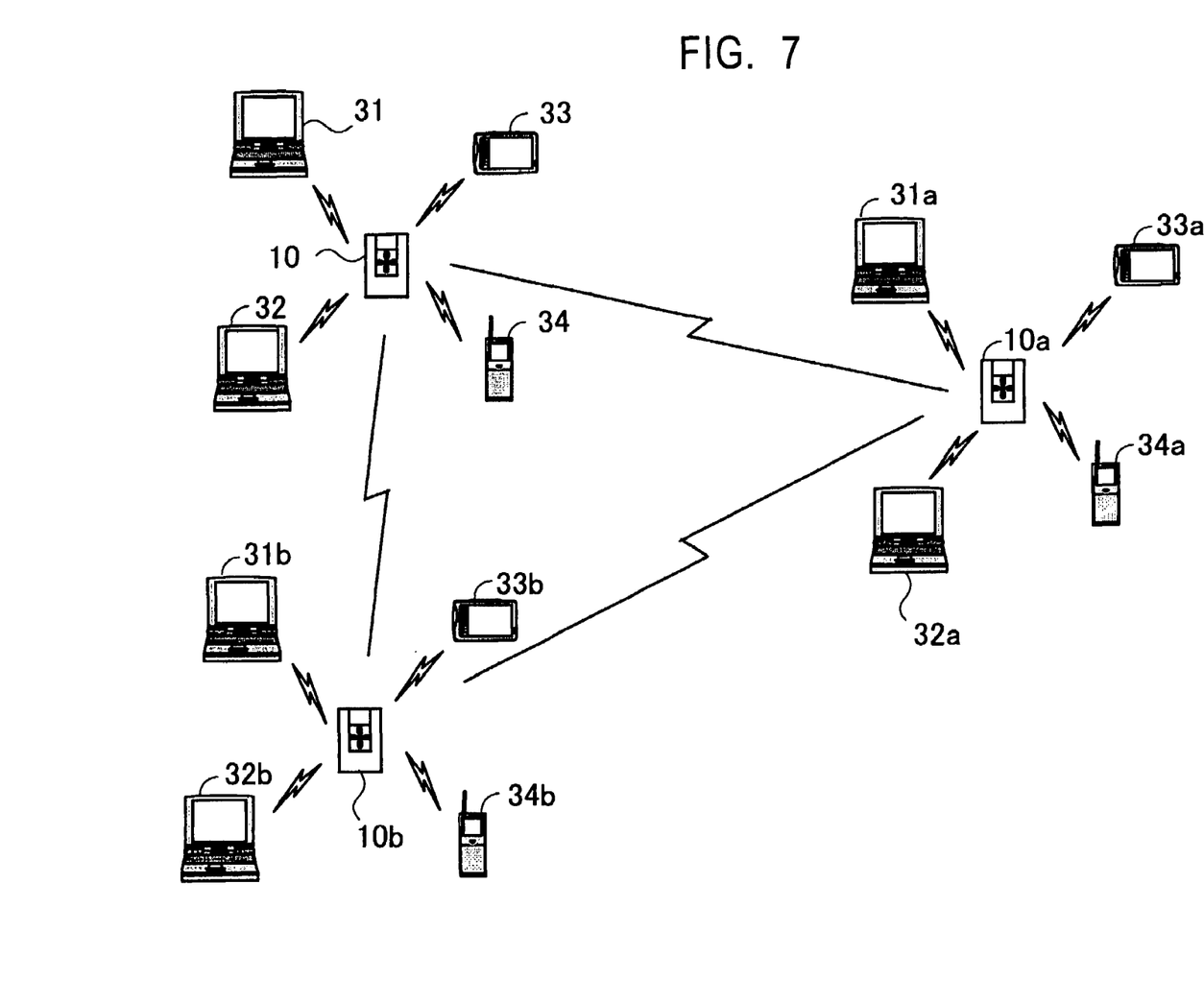
FIG. 7 shows data communication between portable servers that establish a network.

The wireless LAN interface 19 of the portable server 10 allows a plurality of portable servers to exchange data via wireless communication. Referring to FIG. 7, portable servers, each establishing a network, send and receive data between each other. The portable server 10 forms a network with the terminal devices 31 to 34, a portable server 10a forms a network with terminal devices 31a to 34a, and a portable server 10b forms a network with terminal devices 31b to 34b. The portable servers 10, 10a, and 10b send and receive data with each other, and allow themselves to form another network.

For example, the portable servers 10, 10a, and 10b store map data of a first area, a second area, and a third area, respectively. When the three portable servers 10, 10a, and 10b are connected via a network, the users of the terminal devices 31 to 34, 31a to 34a, and 31b to 34b can view the maps of these three areas.

As described above, a plurality of portable servers send and receive data with each other and establish a larger network.

What is claimed is:

1. A portable server for sending and receiving data to and from a plurality of terminal devices, comprising:
   a wireless communication unit for sending and receiving the data via wireless communication;
   a radio field intensity input unit that allows the radio field intensity of the wireless communication unit to be input using an interactive interface, having a plurality of keys, located on the outer surface of the portable server;
   a memory unit for storing the data; a battery in a housing for supplying power to an internal circuit, the wireless communication unit, and the memory unit;
   an authentication unit that compares a stored password with a password entered at power-on and allows the data to be sent and received only when the passwords match; and
   a supply circuit adapted to distribute power to components of the portable server and adapted to draw power from a second power supply when the portable server is connected to a cradle, and to draw power from the battery when the portable server is not connected to the cradle.

2. The portable server according to claim 1, further comprising a power-off unit that stores, in the memory unit, the state of the internal circuit and shuts off the supply of power when the battery voltage drops to a certain level.

3. The portable server according to claim 1, wherein the supply circuit provides power from the second power supply to charge the battery.

4. The portable server according to claim 1, further comprising a wired communication unit for sending and receiving the data via a wired network.

5. The portable server according to claim 1, wherein the supply circuit includes a protection circuit, a charge monitoring circuit, and a voltage stability circuit.

6. The portable server according to claim 5, wherein power from an AC adapter is routed through the protection circuit to the charge monitoring circuit and the voltage stability circuit.

7. The portable server according to claim 6, wherein the protection circuit shuts of high voltage input caused by misuse of the AC adapter.

8. The portable server according to claim 1, wherein the power supply circuit provides voltage at two different power levels.

9. The portable server according to claim 1, wherein the portable server is configured to create a wireless network with at least one local terminal device upon start-up.

10. The portable server according to claim 1, wherein the portable server is configured to create a wireless network with a plurality of terminal devices upon start-up.

11. A portable server according to claim 1, wherein the portable server is configured to communicate with terminals on the wired LAN via a wired LAN interface provided by the cradle when the portable server is coupled to the cradle.

12. A portable server according to claim 1, wherein a radio field intensity input unit allows a radio field intensity to be input using an interface, having a plurality of keys, located on the outer surface of the portable server.

13. A portable server according to claim 12, wherein the radio field intensity input unit allows the radio field intensity to be input by a user using the interface, and the interface provides the user with a plurality of selectable preset radio intensities corresponding to an effective distance of the transmission at each of the plurality of preset radio intensities.

14. A portable server according to claim 12, wherein when the user selects the radio field intensity, the radio field intensity input unit provides the user with a list of the effective distances of transmission at the preset radio intensities.

15. A portable server according to claim 1, wherein the portable server is in communication with at least one other portable server form a network, and the portable servers are configured to send and receive data directly with each other.

16. A portable server according to claim 15, wherein each of the at least one other portable server in the network is in communication with at least one terminal.

\* \* \* \* \*